United States Patent
Turner et al.

(10) Patent No.: US 8,160,187 B1
(45) Date of Patent: Apr. 17, 2012

(54) SYSTEMS AND METHODS FOR CANCELING CROSSTALK FROM DIGITAL MULTI-TONE (DMT) SIGNALS

(75) Inventors: Michael D. Turner, Huntsville, AL (US); Leif J. Sandstrom, Madison, AL (US); John Gordon Brooks, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 1066 days.

(21) Appl. No.: 12/036,855

(22) Filed: Feb. 25, 2008

Related U.S. Application Data

(60) Provisional application No. 60/910,396, filed on Apr. 5, 2007.

(51) Int. Cl.
*H03D 1/04* (2006.01)
*H03D 1/06* (2006.01)
*H03K 5/01* (2006.01)
*H04B 1/10* (2006.01)
*H04L 1/00* (2006.01)

(52) U.S. Cl. .......... 375/346; 375/260; 375/267
(58) Field of Classification Search .......... 375/260, 375/267, 316, 346
See application file for complete search history.

(56) References Cited

U.S. PATENT DOCUMENTS

| | | | | |
|---|---|---|---|---|
| 5,838,740 | A * | 11/1998 | Kallman et al. | 375/346 |
| 6,052,420 | A | 4/2000 | Yeap et al. | |
| 6,546,057 | B1 | 4/2003 | Yeap | |
| 7,324,437 | B1 * | 1/2008 | Czylwik et al. | 370/210 |
| 2002/0154717 | A1 * | 10/2002 | Shima et al. | 375/349 |
| 2002/0160814 | A1 * | 10/2002 | Miya | 455/562 |
| 2003/0118088 | A1 | 6/2003 | Tzannes et al. | |
| 2007/0110131 | A1 * | 5/2007 | Guess et al. | 375/148 |
| 2007/0110132 | A1 * | 5/2007 | Guess et al. | 375/148 |
| 2007/0110133 | A1 * | 5/2007 | Guess et al. | 375/148 |
| 2007/0110135 | A1 * | 5/2007 | Guess et al. | 375/148 |

OTHER PUBLICATIONS

Ginis, et al., "Vector Transmission for Digital Subscriber Line Systems," IEEE Journal on Selected Areas in Communications, vol. No. 5, Jun. 2002.
Cendrillon, et al., "The Linear Zero-Forcing Crosstalk Canceler is Near-Optimal in DSL Channels," Globecom 2004.
Zeng, et al., "Near-end Crosstalk Mitigation in ADSL Systems," IEEE Journal on Selected Areas in Communications, vol. 29, No. 5, Jun. 2002.
Ginis, et al., "Alien Crosstalk Cancellation for Multipair Digital Subscriber Line Systems," EURASIP Journal on Applied Signal Processing, vol. 2006, Article ID 16828, pp. 1-12.
Vanbleu, et al., "Combined Equalization and Alien Crosstalk Cancellation in ADSL Receivers," Proceedings: 3rd IEEE Benelux Signal Processing Symposium, Mar. 2002.

* cited by examiner

*Primary Examiner* — Chieh M Fan
*Assistant Examiner* — Freshteh N Aghdam
(74) *Attorney, Agent, or Firm* — Lanier Ford Shaver & Payne, P.C.; Jon E. Holland

(57) ABSTRACT

The present disclosure generally pertains to systems and methods for cancelling crosstalk. A multiple input, multiple output (MIMO) system in accordance with one exemplary embodiment of the present disclosure has a plurality of receivers, which are capable of exchanging information with one another. Each receiver is coupled to a respective subscriber line and receives signals from a remote transmitter. In each path of the MIMO system, in domain crosstalk and possibly some combination of noise, alien crosstalk, and/or other interference such as RF interference, is canceled from the signal being processed. In some cases, a cancellation signal for cancelling crosstalk is based on an output of a symbol decision element, such as a slicer or decoder, thereby improving the accuracy of the cancellation signal.

18 Claims, 7 Drawing Sheets

SYSTEMS AND METHODS FOR CANCELING CROSSTALK FROM DIGITAL MULTI-TONE (DMT) SIGNALS

CROSS REFERENCE TO RELATED APPLICATION

This application claims priority to U.S. Provisional Patent Application No. 60/910,396, entitled "System for Cancellation of Crosstalk and Interferences," and filed on Apr. 5, 2007, which is incorporated herein by reference.

RELATED ART

In a telecommunication system, data is often communicated across long distances. As an example, data may be communicated between communication equipment residing at a customer premise (CP) and equipment at a central office (CO) of a communication network, such as the public switched telephone network (PSTN). Often, the CO equipment and customer premise equipment (CPE) are coupled to each other by a conductive medium, referred to as a "subscriber line," which can extend up to several miles. The quality of the signals communicated across a subscriber line can be degraded due to various factors, including attenuation, line impairments and noise. Generally, signal degradation increases as the reach of a subscriber line increases.

Noise can be introduced from many different sources. For example, one type of noise, referred to as "RF noise," results from radio frequency (RF) energy from radio stations or other sources of RF energy. RF energy from the atmosphere couples into a subscriber line and interferes with the signals being communicated across the line. In addition, many subscriber lines are often bundled in a single cable and are, therefore, in close proximity to one another. The energy of a signal on one loop may couple into another loop and interfere with the signal being communicated across this other loop. Such noise is referred to as "crosstalk." There are many other sources of noise that can interfere with signals being communicated across a subscriber line.

In an effort to enhance signal quality, adaptive filtering techniques have been developed. An adaptive filter attempts to eliminate interference in signals received at a receiver by generating a set of coefficients that, when combined with the signals, cancel or reduce the effects of noise and the effects of various channel impairments from the signals thereby improving signal quality. Unfortunately, the parameters associated with crosstalk are initially unknown and must be determined. Measurement and calculations for determining the channel characteristics may involve complex mathematical operations such as inversion of large matrices. Furthermore, the amount of crosstalk and other noise present in a channel and the overall channel characteristics change over time making it difficult and problematic to effectively eliminate crosstalk and other noise from the received signals as may be desired. Some adaptive methods may encounter problems due to undesirable interaction among different coefficients as adaptive algorithms are carried out. The coefficients used in reducing crosstalk may be updated in an effort to compensate for changes in noise or channel characteristics, but such updates are often unable to sufficiently eliminate interference from the received signals. Furthermore, some filtering architectures may enhance (increase) additive noise and crosstalk from some sources even as crosstalk from other sources is reduced.

Noise, such as crosstalk, which can change abruptly, is particularly problematic, and current techniques are able to compensate for crosstalk only to a limited extent. Improved techniques for eliminating sources of error perturbing the signal, particularly from crosstalk, are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for cancelling crosstalk. A multiple input, multiple output (MIMO) system in accordance with one exemplary embodiment of the present disclosure has a plurality of receivers, which are capable of exchanging information with one another. As an example, each of the receivers may reside at the same location (e.g., a field office or customer premise) and communicate with the other receivers. Further, each receiver is coupled to a respective subscriber line and receives signals from a remote transmitter. The subscriber lines may be bundled within the same cable, and the received signals include in domain crosstalk. As known in the art, "in domain crosstalk" refers to crosstalk among signals to be received by receivers capable of communicating with one another so that the crosstalk may be cancelled in at least one of the receivers based on information from the other receivers.

In each path of the MIMO system, in domain crosstalk is canceled from the signal being processed. For example, a receiver in one path receives a data signal, referred to as "received data signal," from its respective subscriber line. The received data signal is combined with a plurality of cancellation signals. Each such cancellation signal is correlated with crosstalk induced by a signal communicated across another of the subscriber lines. In one exemplary embodiment, a cancellation signal is formed by multiplying a scaling coefficient with a constellation symbol of a data signal received from a subscriber line so that the resulting cancellation signal represents an estimate of the inverse of the crosstalk from the subscriber line. Thus, by combining the cancellation signal with a received signal, in domain crosstalk is canceled from the received signal. In some cases, a cancellation signal for cancelling in domain crosstalk is based on an output of a symbol decision element thereby improving the accuracy of the cancellation signal, as described in more detail hereafter.

Figure 1:
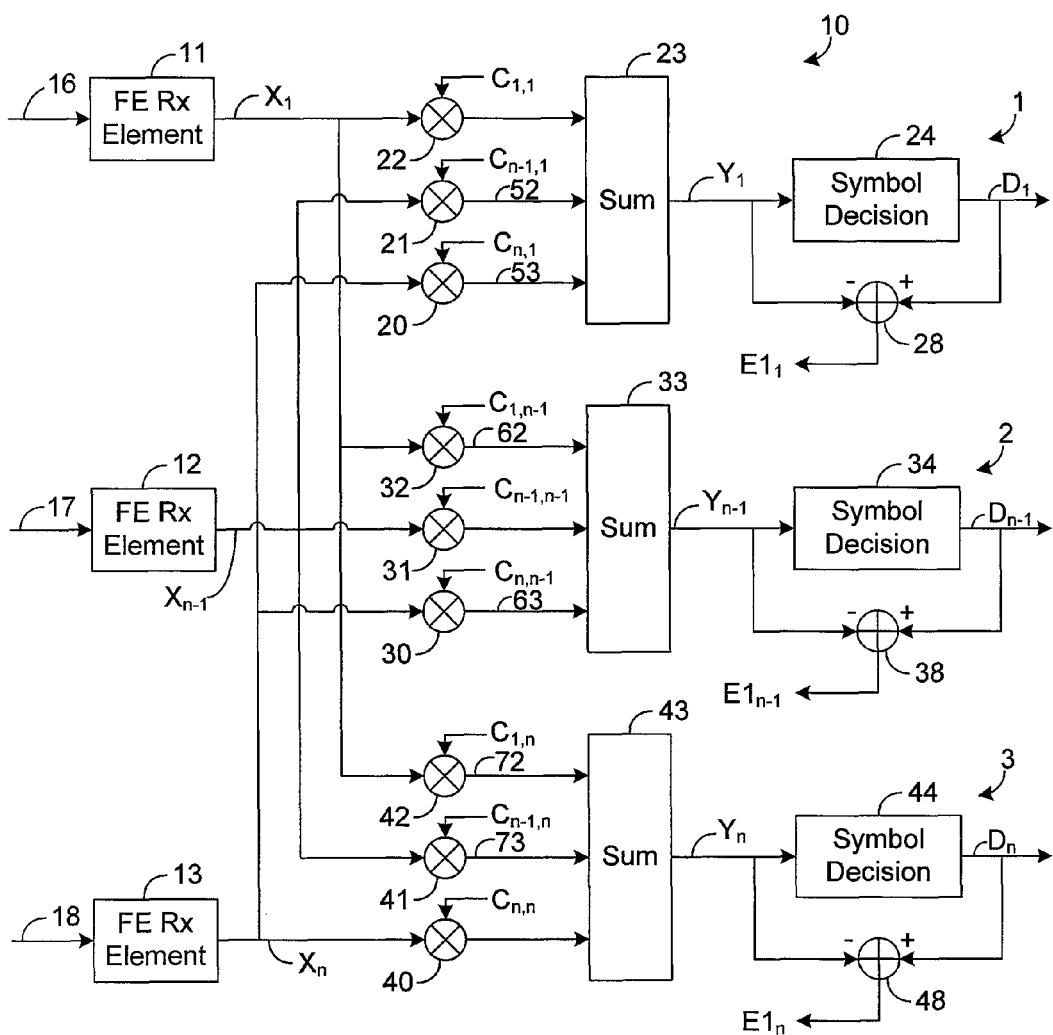
FIG. 1 is a block diagram illustrating a conventional communication system.

Before further describing aspects of the present disclosure, it may be useful to first describe some conventional crosstalk cancellation techniques. FIG. 1 depicts a communication system 10 in accordance with the prior art. The system 10 has a plurality of receivers 1-3 respectively coupled to a plurality of subscriber lines 16-18. Each of the receivers 1-3 is a digital multi-tone (DMT) receiver, such as an asymmetric digital subscriber line (ADSL) or very-high-data-rate digital subscriber line (VDSL) receiver. The receivers 1-3 are sufficiently co-located (e.g., at the same premise) so that information can be successfully exchanged between the receivers 1-3. In this regard, each receiver 1-3 is coupled to and communicates with each of the other receivers 1-3. As an example, the receivers 1-3 may be at the same customer premise or at the same field office of a communication network, such as the public switched telephone network (PSTN). Thus, a signal received by one of the receivers 1-3 can be used by another of the receivers 1-3 in order to cancel crosstalk, as will be described in more detail hereafter.

Note that the system 10 may have any number, n, of receivers. In the embodiment shown by FIG. 1, there are three receivers (i.e., n equals 3). To facilitate understanding of how the configuration of the system 10 may be scaled to a larger number of receivers, one of the receivers 1 is referred to as "path$_1$," and another of the receivers 2 is referred to as "path$_{n-1}$." In addition, the other receiver 3 is referred to as "path$_n$."

Each path of the system 10 comprises a front end (FE) receiving element, a plurality of signal combiners, and a symbol decision element. For example, receiver 1 or path$_1$ comprises FE receiving element 11, signal combiners 20-23, and a symbol decision element 24. The signal combiner 23 is coupled to the symbol decision element 24 and the signal combiners 20-22. Both the input and the output of the symbol decision element 24 are coupled to a signal combiner 28. For DMT receivers, FE element 11 includes a fast Fourier transform (FFT) function that separates the received signal into many individual subcarrier tones.

Another receiver 2 or path$_{n-1}$ comprises FE receiving element 12, signal combiners 30-33, and a symbol decision element 34. The signal combiner 33 is coupled to the symbol decision element 34 and the signal combiners 30-32. Both the input and the output of symbol decision element 34 are coupled to a signal combiner 38. For DMT receivers, FE element 12 includes an FFT function that separates the received signal into many individual subcarrier tones.

In addition, a receiver 3 or path$_n$ comprises FE receiving element 13, signal combiners 40-43, and a symbol decision element 44. The signal combiner 43 is coupled to the symbol decision element 44 and the signal combiners 40-42. Both the input and the output of the symbol decision element 44 are coupled to a signal combiner 48. For DMT receivers, FE element 13 includes an FFT function that separates the received signal into many individual subcarrier tones.

FIG. 1 depicts components for processing a single tone only. A typical system includes hundreds or thousands of tones and, for each tone, an arrangement of components like the one shown in FIG. 1.

Note that a "signal combiner" refers to an element that combines a plurality of input signals to form an output signal that is based on each of the plurality of input signals. Depending on the context in which a signal combiner is used, it may be desirable for a signal combiner to perform a mathematical operation (e.g., addition or multiplication) when combining multiple input signals. As used hereafter, signal combiners that multiply input signals are referred to as "multipliers." In addition, signal combiners that add input signals are referred to as "summers."

For illustrative purposes, it will be assumed hereafter that each receiver 1-3 receives a DMT signal from its respective subscriber line and outputs an estimated constellation symbol, X, of the received DMT signal for the tone being processed. For example, the FE receiving element 11 of the receiver 1 transmits an estimated constellation symbol, $X_1$, of the DMT signal received from subscriber line 16 for the tone being processed by the receivers 1-3 shown by FIG. 1. Further, the FE receiving element 12 of the receiver 2 transmits an estimated constellation symbol, $X_{n-1}$, of the DMT signal received from subscriber line 17 for the tone being processed by the receivers 1-3 shown by FIG. 1, and the FE receiving element 13 of the receiver 3 transmits an estimated constellation symbol, $X_n$, of the DMT signal received from subscriber line 18 for the tone being processed by the receivers 1-3 shown by FIG. 1.

Further, each of the DMT signals in FIG. 1 is in the same frequency band or, in other words, at the same tone such that they generate in domain crosstalk interference for the other DMT signals. A DMT symbol contains many different subcarrier tones, and each tone is modulated by a constellation symbol assigned to that tone. Note that the FE receiving elements 11-13 may perform demodulation, signal shaping, filtering, FFT (Fast Fourier Transform) operations, and other known signal processing techniques in order to provide a distinct estimated symbol (X) for each individual tone of a respective data signal. A MIMO system of DMT receivers contains many parallel paths like those shown in FIG. 1, each assigned to one of the specific subcarrier tones that make up the DMT signal.

Note that a "symbol decision element" refers to an element that receives an estimated constellation symbol for a received data signal and uses a known decision algorithm to calculate a final symbol, which is typically more accurate than the estimated symbol input to the symbol decision element. For example, a symbol decision element may comprise a decoder or slicer.

During communication of signals across subscriber lines 16-18, signals from any of the subscriber lines 16-18 may couple into any of the other subscriber lines 16-18 inducing in domain crosstalk interference. For example, signals from subscriber lines 17, 18 may couple into subscriber line 16 interfering with a signal being communicated across subscriber line 16, which is received by receiver 1 and referred to hereafter as the "received signal" in the current example.

The FE receiving element 11 demodulates the received signal and performs various processing on the received signal, such as filtering, shaping, FFT operations, and/or other known signal processing. The FE receiving element 11 also estimates a symbol ($X_1$) for the received signal. The estimated symbol $X_1$ is received by multiplier 22, which multiplies the estimated symbol $X_1$ by a coefficient $C_{1,1}$. The coefficient $C_{1,1}$ is a complex-valued scaling coefficient that is adaptively updated in an effort to account for variations in the amplitude and phase characteristics of the subscriber line 16. Thus, the symbol $X_1$, after being output by the multiplier 22, is properly scaled and is rotated to the correct phase angle.

The multiplier 21 receives, as input, the estimated symbol $X_{n-1}$ transmitted by the FE receiving element 12. The multiplier 21 multiplies the estimated symbol $X_{n-1}$ by an adaptive coefficient $C_{n-1,1}$ to provide a cancellation signal 52, which represents an estimate of the inverse of the in domain crosstalk interference from the subscriber line 17 for the symbol $X_1$. Thus, by adding the cancellation signal 52 to the symbol being output by the multiplier 22, the summer 23 cancels, from such symbol, in domain crosstalk coupled from the subscriber line 17 to the subscriber line 16.

The multiplier 20 receives, as input, the estimated symbol $X_n$ transmitted by the FE receiving element 13. The multiplier 20 multiplies the estimated symbol $X_n$ by a scaling coefficient $C_{n,1}$ to provide a cancellation signal 53, which represents an estimate of the inverse of the in domain crosstalk interference from the subscriber line 18 for the symbol $X_1$. Thus, by adding the cancellation signal 53 to the symbol that is output by multiplier 22, the summer 23 cancels, from such symbol, in domain crosstalk coupled from the subscriber line 18 to the subscriber line 16.

Accordingly, the output of the summer 23, referred to as $Y_1$, is the estimated symbol of the received signal of $path_1$ ideally free of in domain crosstalk from subscriber lines 17, 18. However, in practice, the cancellation signals 52, 53 may not be perfect estimates of the in domain crosstalk interfering with the received signal, and there may exist at least some in domain crosstalk interference in the estimated symbol $Y_1$ that is being transmitted to the symbol decision element 24 by the summer 23.

The symbol decision element 24 receives the estimated symbol $Y_1$ from the summer 23, after cancellation of in domain crosstalk, and performs a known decision process on the estimated symbol $Y_1$ to convert $Y_1$ into a final decision symbol $(D_1)$ for the $path_1$. Thus, the output of the symbol decision element 24 is the decided symbol for $path_1$, which is likely more accurate relative to the input symbol $Y_1$.

The summer 28 receives the estimated symbol $Y_1$ and the decided symbol $D_1$ and subtracts such symbols to provide an error signal $(E_1)$, which represents the difference between the input and output of the element 24. Thus, the error signal $E1_1$ indicates the amount of error associated with the estimation of the symbol $Y_1$.

Figure 2:
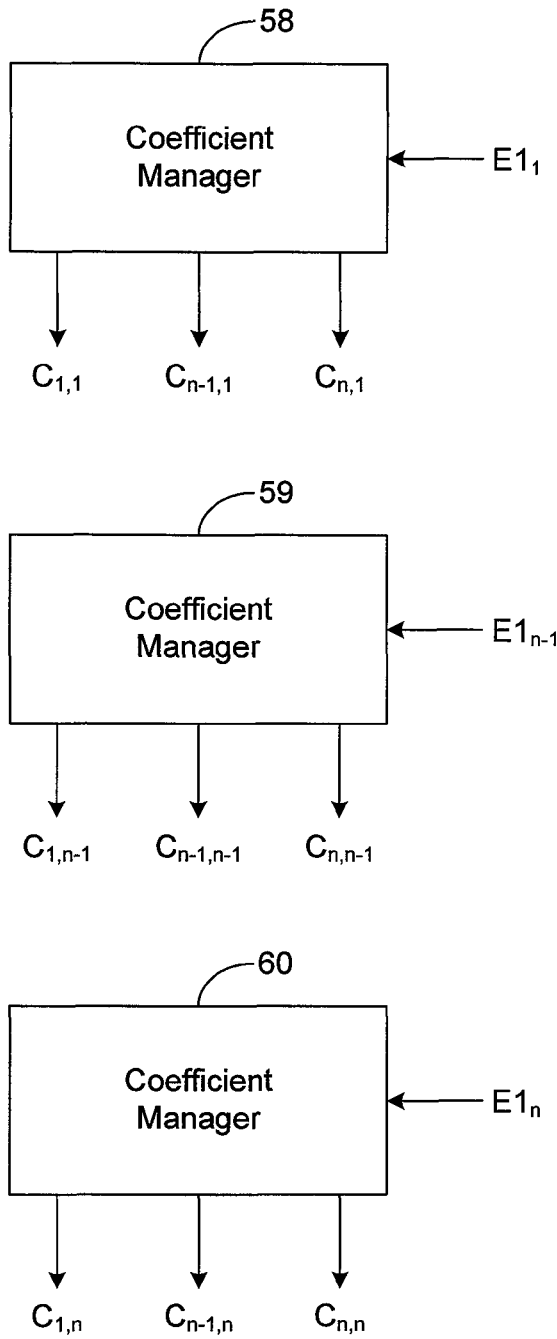
FIG. 2 is a block diagram illustrating coefficient managers for updating coefficients used by the conventional communication system depicted by FIG. 1.

The error signal $E1_1$ is used to update the coefficients (i.e., $C_{1,1}$, and $C_{n-1,1}$) on which the input to the element 24 (i.e., symbol $Y_1$) is based. In this regard, FIG. 2 depicts a coefficient manager 58, which is configured to store the coefficients $C_{1,1}$, $C_{n-1,1}$, and $C_{n,1}$ and to provide such coefficients to the multipliers 20-22. The coefficient manager 58 receives the error signal $E1_1$ and uses a known coefficient update algorithm, such as least mean squares (LMS), to update the coefficients $C_{1,1}$, $C_{n-1,1}$, and $C_{n,1}$ based on the error signal $E1_1$. Thus, the coefficients are adaptively updated to initially train the crosstalk cancellation system and to better eliminate crosstalk as conditions change.

The other paths are configured and operate similar to the $path_1$ described above. In this regard, for $path_{n-1}$, the multiplier 31 receives the estimated symbol $X_{n-1}$ from the FE receiving element 12 and multiplies an adaptive coefficient $C_{n-1,n-1}$ by the symbol $X_{n-1}$ in order to correct the amplitude scaling and the phase angle of such symbol. In addition, the multiplier 32 multiplies an adaptive coefficient $C_{1,n-1}$ by the estimated symbol $X_1$ from the FE receiving element 11 in order to provide a cancellation signal 62 that represents the inverse of the crosstalk interference from the subscriber line 16. Also, multiplier 30 multiplies an adaptive scaling coefficient $C_{n,n-1}$ by the estimated symbol $X_n$ from the FE receiving element 13 in order to provide a cancellation signal 63 that represents an inverse of the crosstalk interference from the subscriber line 18. Thus, by summing the outputs of multipliers 30-32, the summer 33 cancels in domain crosstalk induced by the signals communicated across lines 16, 18 to provide an estimated symbol $Y_{n-1}$ ideally free of in domain crosstalk interference. However, in practice, the cancellation signals 62, 63 may not be perfect estimates of the in domain crosstalk interference, and the estimated symbol $Y_{n-1}$ may still contain some in domain crosstalk.

The symbol decision element 34 receives the estimated symbol $Y_{n-1}$, after cancellation of in domain crosstalk, and performs a known decision process on the estimated symbol $Y_{n-1}$ to convert $Y_{n-1}$ to a final decision symbol $(D_{n-1})$ for the $path_{n-1}$. The summer 38 subtracts the estimated symbol $Y_{n-1}$ from the decided symbol $D_{n-1}$ to provide an error signal $E1_{n-1}$, which is used to update the coefficients (i.e., $C_{1,n-1}$, $C_{n-1,n-1}$, and $C_{n,n-1}$) on which the input to the element 34 (i.e., symbol $Y_{n-1}$) is based. In this regard, referring to FIG. 2, a coefficient manager 59 is configured to store the coefficients $C_{1,n-1}$, $C_{n-1,n-1}$, and $C_{n,n-1}$ and to provide such coefficients to the multipliers 30-32. The coefficient manager 59 receives the error signal $E1_{n-1}$ and uses a known coefficient update algorithm, such as LMS, to update the coefficients $C_{1,n-1}$, $C_{n-1,n-1}$, and $C_{n,n-1}$ based on the error signal $E1_{n-1}$. Thus, the coefficients are adaptively updated to initially train the crosstalk cancellation system and to better eliminate crosstalk as conditions change.

In addition, the multiplier 40 receives the estimated symbol $X_n$ from the FE receiving element 13 and multiplies an adaptive scaling coefficient $C_{n,n}$ to correct the amplitude scaling and the phase angle of the symbol $X_n$ before such symbol is received by the summer 43. In addition, the multiplier 42 multiplies an adaptive scaling coefficient $C_{1,n}$ by the estimated symbol $X_1$ from the FE receiving element 11 in order to provide a cancellation signal 72 that represents the inverse of the crosstalk interference from the subscriber line 16. Also, multiplier 41 multiplies an adaptive scaling coefficient $C_{n-1,n}$ by the estimated symbol $X_{n-1}$ from the FE receiving element 12 in order to provide a cancellation signal 73 that represents the inverse of the crosstalk interference from the subscriber line 17. Thus, by summing the outputs of multipliers 40-42, the summer 43 cancels in domain crosstalk induced by the signals communicated across subscriber lines 16, 17 to provide an estimated symbol $Y_n$ ideally free of in domain crosstalk interference. However, in practice, the cancellation signals 72, 73 may not provide perfect estimates of the in domain crosstalk interference, and the estimated symbol $Y_n$ may still contain some in domain crosstalk.

The symbol decision element 44 receives the estimated symbol $Y_n$ and performs a known decision process on the estimated symbol $Y_n$ to convert $Y_n$ to a final decision symbol $(D_n)$ for the $path_n$. The summer 48 subtracts the estimated symbol $Y_n$ from the final symbol $D_n$ to provide an error signal $E1_n$, which is used to update the coefficients (i.e., $C_{1,n}$, $C_{n-1,n}$, and $C_{n,n}$) on which the input of the element 44 (i.e., symbol $Y_n$) is based. In this regard, referring to FIG. 2, a coefficient manager 60 receives the error signal $E1_n$ and uses a known coefficient update algorithm, such as LMS, to update the coefficients $C_{1,n}$, $C_{n-1,n}$, and $C_{n,n}$ based on the error signal $E1_n$. Thus, the coefficients are adaptively updated to initially train the crosstalk cancellation system and to better eliminate crosstalk as conditions change.

Figure 3:
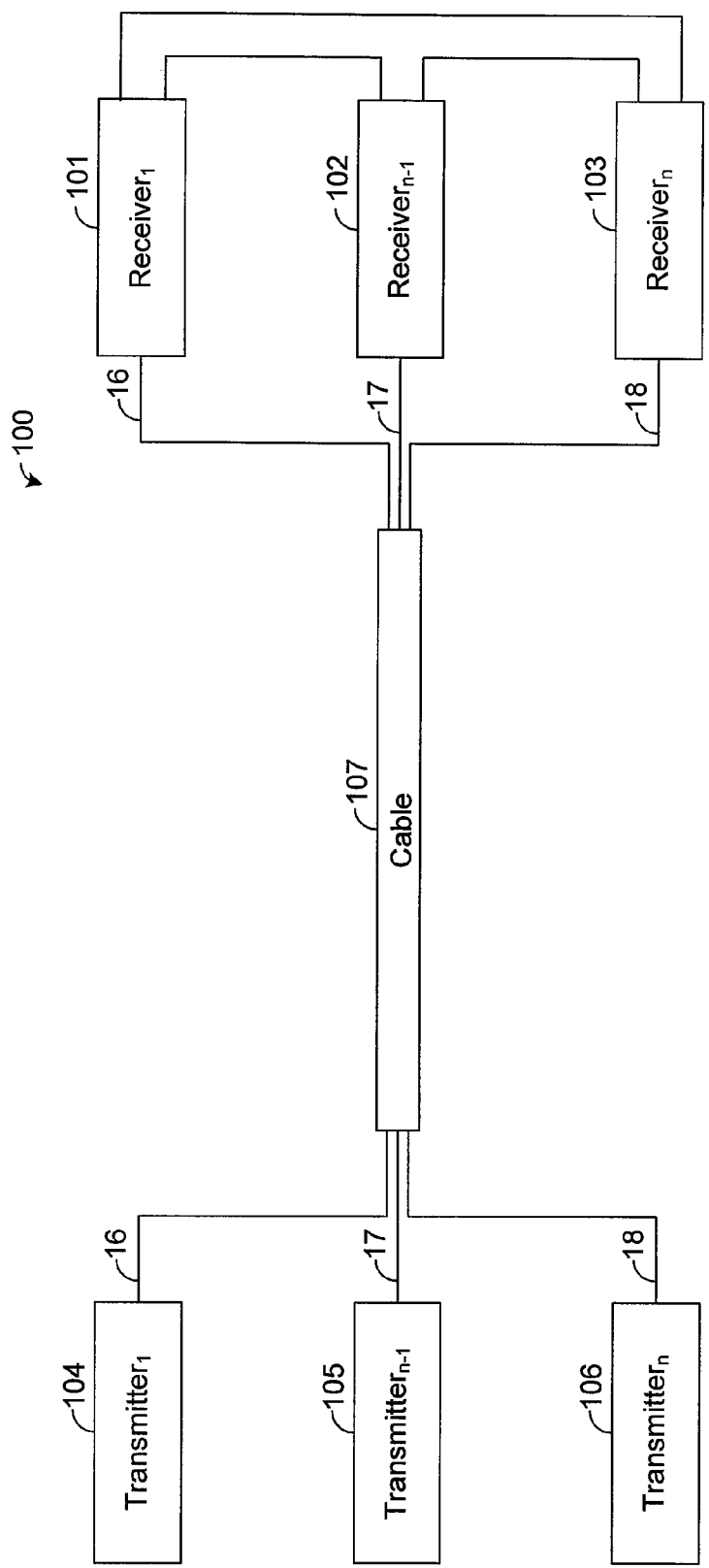
FIG. 3 is a block diagram illustrating an exemplary embodiment of a communication system in accordance with the present disclosure.

FIG. 3 depicts an exemplary embodiment of a communication system 100 in accordance with the present disclosure. The system 100 comprises a plurality of receivers 101-103, each of which is coupled to a respective transmitter 104-106 located remotely from the receivers 101-103. In this regard, the receiver 101 is coupled to the transmitter 104 via subscriber line 16. In addition, the receiver 102 is coupled to the transmitter 105 via subscriber line 17, and the receiver 103 is coupled to the transmitter 106 via the subscriber line 18. As shown by FIG. 3, each of the subscriber lines 16-18 is bundled in the same cable 107 and, therefore, located in close proximity to one another such that energy from one subscriber line couples into the other subscriber lines causing crosstalk interference.

The receivers 101-103 are coupled to and communicate with one another so that at least one of the receivers can cancel noise based on information from the other receivers. Thus, crosstalk interference induced by energy from one of the subscriber lines 16-18 affecting the signals communicated across any of the other subscriber lines 16-18 is "in domain." The receivers 101-103 are substantially co-located (e.g., at the same field office or customer premise), and the transmitters 104-106 may be either co-located or located at different premises. The system 100 of FIG. 3 may have any number of transmitters 104-106 and receivers 101-103. For simplicity, FIG. 3 shows just three transmitters 104-106 and receivers 101-103 (i.e., n equals 3). However, in other embodiments, other numbers, n, of transmitters and receivers are possible. To facilitate an understanding of how the configuration of the system 100 may be scaled to a larger number of receivers, the receivers 101-103 are respectively referred to as "$path_1$," "$path_{n-1}$," and "$path_n$."

In one exemplary embodiment, DMT signals are transmitted from the transmitters 104-106 to the receivers 101-103. The DMT signals are subject to in domain crosstalk and other types of interference, and the receivers 101-103 are configured to cancel at least some crosstalk, as will be described in more detail hereafter.

Figure 4:
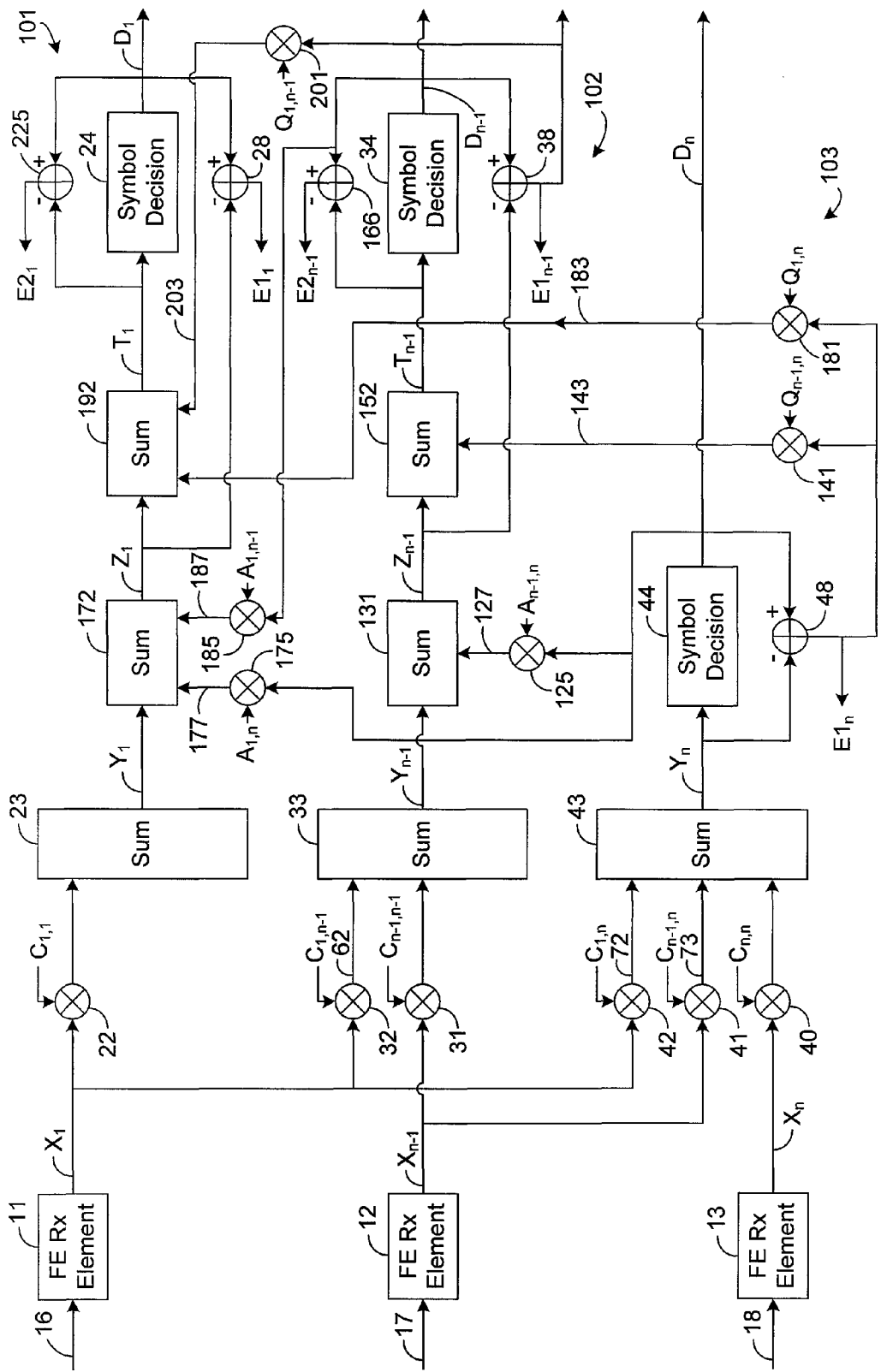
FIG. 4 is a block diagram illustrating an exemplary embodiment of receivers depicted in FIG. 3.

FIG. 4 depicts an exemplary embodiment of each receiver 101-103. Similar to the conventional system 10 shown by FIG. 1, the receivers 101-103 comprise multipliers 22, 31, 32, 40-42, summers 23, 28, 33, 38, 43, 48, and symbol decision elements 24, 34, 44, which operate generally as described above for the conventional system 10. In this regard, multipliers 22, 31, and 40 multiply the estimated symbol of their respective path to a respective scaling coefficient in order to correct the amplitude scaling and the phase angle of the symbols estimated by the FE receiving elements 11-13, respectively. For example, the multiplier 22 multiplies the coefficient $C_{1,1}$ by the constellation symbol $X_1$ estimated by the FE receiving element 11 for the tone being processed in order to correct the amplitude scaling and the phase angle of such symbol, and the multiplier 31 multiplies the coefficient $C_{n-1,n-1}$ by the constellation symbol $X_{n-1}$ estimated by the FE receiving element 12 for the tone being processed in order to correct the amplitude scaling and the phase angle of such symbol. Further, the multiplier 40 multiplies the coefficient $C_{n,n}$ by the constellation symbol $X_n$ estimated by the FE receiving element 13 for the tone being processed in order to correct the amplitude scaling and the phase angle of such symbol.

In addition, for one path (i.e., $path_n$ in the instant embodiment), scaling coefficients are used to cancel in domain crosstalk from each of the other paths, as described above for the conventional system 10. Thus, multiplier 42 multiplies the coefficient $C_{1,n}$ by the symbol $X_1$ estimated by the FE receiving element 11 in order to provide the cancellation signal 72, which represents the inverse of the crosstalk interference, in the symbol $X_n$, from the subscriber line 16. In addition, multiplier 41 multiplies the coefficient $C_{n-1,n}$ by the symbol $X_{n-1}$ estimated by the FE receiving element 12 in order to provide the cancellation signal 73, which represents the inverse of the crosstalk interference, in the symbol $X_n$, from the subscriber line 17. Thus, by summing the output of multipliers 40-42, the summer 43 cancels in domain crosstalk interference in the symbol $X_n$ to provide a symbol $Y_n$ ideally free of in domain crosstalk. However, as described above, cancellation signals 72, 73 may not provide perfect estimations of the in domain crosstalk interference, and the symbol $Y_n$ may still contain some in domain crosstalk.

As described above for the conventional system 10, the symbol decision element 44 provides a final decision symbol ($D_n$), and the summer 48 provides an error signal $E1_n$, which is used to update the coefficients (i.e., $C_{1,n}$, $C_{n-1,n}$, and $C_{n,n}$) on which the input to the symbol decision element 44 (i.e., symbol $Y_n$) is based. In this regard, the coefficient manager 60 (FIG. 5) receives the error signal $E1_n$ and uses a known coefficient update algorithm, such as LMS, to update the coefficients $C_{1,n}$, $C_{n-1,n}$, and $C_{n,n}$ based on the error signal $E1_n$. Thus, $path_n$ provides a final decision symbol $D_n$ and an error signal $E1_n$, like $path_n$ of the conventional system 10.

At least one of the other paths, however, uses the decided symbol $D_n$ from $path_n$ to cancel in domain crosstalk from its respective symbol. Indeed, in at least one embodiment, as shown by FIG. 4, each of the remaining paths uses the decided symbol $D_n$ from $path_n$ to cancel in domain crosstalk instead of using the cancellation signals 53, 63 shown by FIG. 1. In this regard, referring to $path_{n-1}$, there is no multiplier 30, unlike $path_{n-1}$ for the conventional system 10 shown by FIG. 1. Thus, the summer 33 does not cancel crosstalk interference caused by energy from subscriber line 18. Instead, the summer 33 combines the cancellation signal 62 with the symbol being output by the multiplier 31 in order to cancel crosstalk interference caused by energy from subscriber line 16. Thus, the symbol $Y_{n-1}$ transmitted from the summer 33 represents the symbol received from subscriber line 17 ideally free of crosstalk from subscriber line 16, although the symbol may include some crosstalk from subscriber line 16 since the cancellation signal 62 is may not be perfect estimation of such crosstalk. However, the symbol $Y_{n-1}$ still likely includes a significant amount of crosstalk from subscriber line 18.

As shown by FIG. 4, a multiplier 125 receives the final decision symbol $D_n$ from symbol decision element 44 of $path_n$ and multiplies this symbol $D_n$ by an adaptive scaling coefficient $A_{n-1,n}$ to provide a cancellation signal 127, which represents an estimate of the inverse of the in domain crosstalk interference from subscriber line 18 interfering with the symbol $Y_{n-1}$. A summer 131 adds the cancellation signal 127 to the estimated symbol $Y_{n-1}$ thereby canceling crosstalk interference from subscriber line 18. Thus, the symbol ($Z_{n-1}$) output by the summer 131 is ideally free of in domain crosstalk interference, although there is likely to be remaining noise and crosstalk, referred to as "alien crosstalk," from other paths and it is possible that there may also be some residual in domain crosstalk. However, since the cancellation signal 127 is based on the decision symbol $D_n$, which likely contains no noise or crosstalk, the cancellation signal 127 likely provides a better estimation of the crosstalk interference from subscriber line 18 as compared to cancellation signal 63 (FIG. 1) and, therefore, better cancels such crosstalk interference, assuming the decision $D_n$ is correct.

Note that the error indicated by the signal $E1_n$ is affected by noise and alien crosstalk that interfere with the estimated symbol $Y_n$. The term "alien crosstalk" refers to any crosstalk that is not in domain crosstalk. For example, alien crosstalk can be induced on any or all lines 16, 17, 18, by a signal to be received by a receiver (not shown in FIG. 4) unable to exchange information with the in domain receivers 101-103. Correlated error components may be introduced on various lines 16, 17, 18, by alien crosstalk or RF (radio frequency) interference or by other noise sources. In addition, the symbols $X_1$, $X_{n-1}$ respectively input to the multipliers 42, 41 may contain noise and alien crosstalk, and so are not generally perfect estimates. Thus, the cancellation signals 72, 73 may introduce some additional noise and alien crosstalk into the symbol $Y_n$ when they are summed with the output of multiplier 40 in order to cancel in domain crosstalk interference. The error indicated by the signal $E1_n$ is affected by noise and alien crosstalk, some of which may be introduced by the cancellation signals 72, 73.

In the exemplary embodiment shown by FIG. 4, a multiplier 141 receives the error signal $E1_n$ and multiplies such signal by a scaling coefficient, $Q_{n-1,n}$ to provide a cancellation signal 143, which represents an inverse of an estimate of various correlated error sources, such as alien crosstalk and other noise, some of which may be introduced by in domain crosstalk cancellation signals 72, 73. For example, the noise introduced into $path_n$ by cancellation signal 62 is correlated with the noise introduced into $path_n$ by cancellation signal 72 since such signals 62, 72 are based on the same symbol $X_1$. Thus, the noise introduced into $path_{n-1}$ by cancellation signal 62 (as well as other noise, such as alien crosstalk) is cancelled by cancellation signal 143. Moreover, a summer 152 adds the cancellation signal 143 and the symbol $Z_{n-1}$ from the summer 131 thereby cancelling various correlated noise components from the $path_n$ to provide a symbol $T_{n-1}$ that contains less error relative to the symbol $Z_{n-1}$ prior to summer 152. The symbol decision element 34 receives the symbol $T_{n-1}$ from the summer 152 and performs a known decision process on the symbol $T_{n-1}$ to convert $T_{n-1}$ to a decided symbol ($D_{n-1}$).

Figure 5:
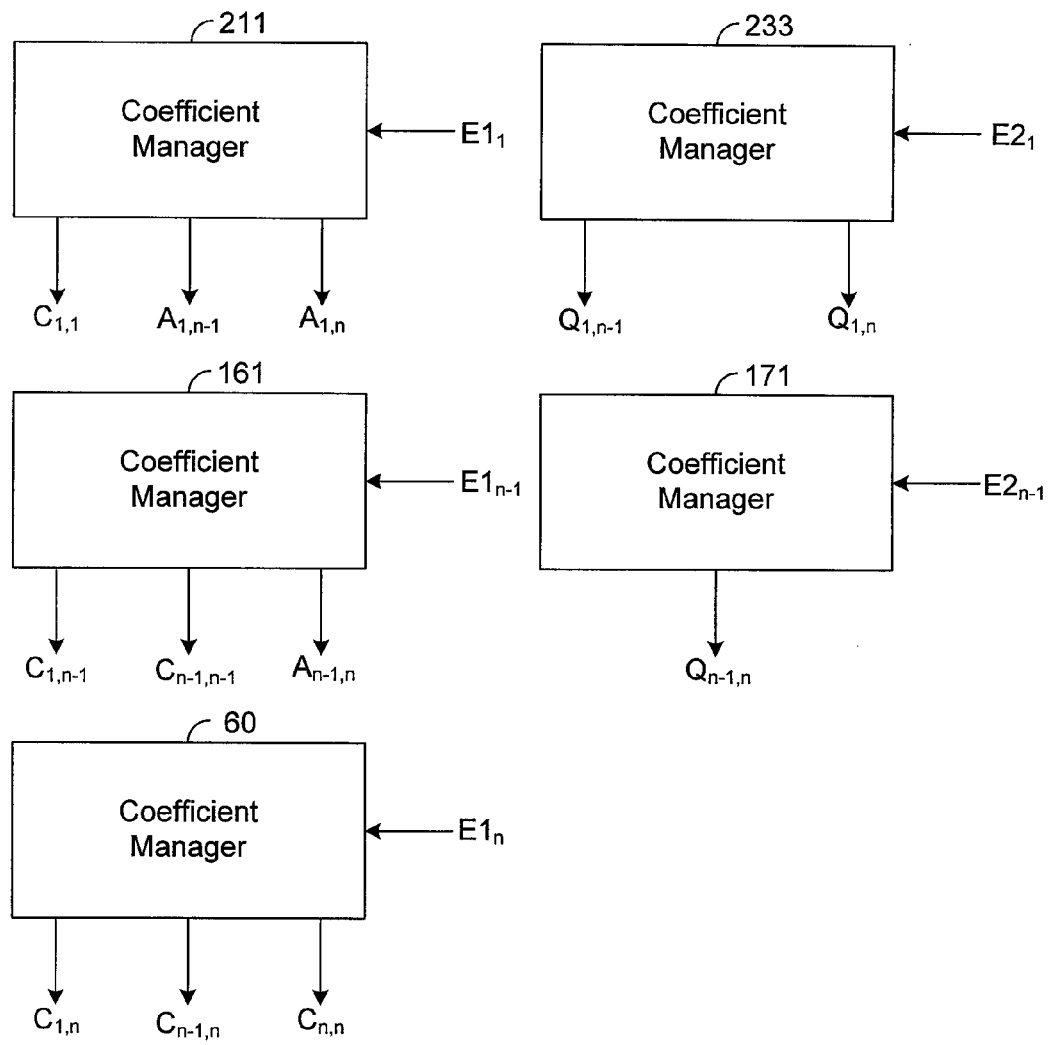
FIG. 5 is a block diagram illustrating exemplary coefficient managers for updating coefficients used by the receivers depicted by FIG. 4.

The summer 38 subtracts the estimated symbol $Z_{n-1}$ from the decided symbol $D_{n-1}$ to provide an error signal $E1_{n-1}$, which is used to update the coefficients (i.e., $C_{1,n-1}$, $C_{n-1,n-1}$, and $A_{n-1,n}$) on which the symbol $Z_{n-1}$ is based. In this regard, as shown by FIG. 5, a coefficient manager 161 stores the coefficients $C_{1,n-1}$, $C_{n-1,n-1}$, and $A_{n-1,n}$ and provides such coefficients to the multipliers 31, 32, and 125. The coefficient manager 161 receives the error signal $E1_{n-1}$ and uses a known coefficient update algorithm, such as LMS, to update the coefficients $C_{1,n-1}$, $C_{n-1,n-1}$, and $A_{n-1,n}$ based on the error signal $E1_{n-1}$. Thus, the coefficients are adaptively updated to initially train the crosstalk cancellation system and to better eliminate error as conditions change.

Note that a "C" coefficient, as used herein, refers to an adaptive coefficient that is combined with an estimated symbol X, and an "A" coefficient refers to an adaptive coefficient that is combined with a final decision symbol D. In addition, a "Q" coefficient refers to an adaptive coefficient that is combined with an error signal, E1.

As shown by FIG. 4, a summer 166 subtracts the estimated symbol $T_{n-1}$ from the decided symbol $D_{n-1}$ to provide an error signal $E2_{n-1}$, which is used to update each Q coefficient on which the symbol $T_{n-1}$ is based. In the current example, $T_{n-1}$ is based on $Q_{n-1,n}$. As shown by FIG. 5, a coefficient manager 171 stores the coefficient $Q_{n-1,n}$ and provides such coefficient to the multiplier 141. The coefficient manager 171 receives the error signal $E2_{n-1}$ and uses a known coefficient update algorithm, such as LMS, to update the coefficient $Q_{n-1,n}$ based on the error signal $E2_{n-1}$. Thus, the coefficient $Q_{n-1,n}$ is adaptively updated to initially train the crosstalk cancellation system and to better eliminate error as conditions change.

Each remaining path (i.e., $path_1$ in the current example) uses the decided symbols and the error signals from $path_n$ and $path_{n-1}$ to cancel noise, as shown by FIG. 4. In this regard, referring to $path_1$, there are no multipliers 20, 21, unlike $path_1$ for the conventional system 10 shown by FIG. 1. Thus, the summer 23 does not cancel crosstalk interference caused by energy from subscriber lines 17, 18. Indeed, if there is no need to use the summer 23 to cancel other sources of noise, the summer 23 can be eliminated from the receiver 101 such that the output of multiplier 22 is transmitted directly to a summer 172 rather than summer 23. Note that in domain crosstalk from $path_n$ and $path_{n-1}$ has not been canceled from the symbol $Y_1$ received by the summer 172, and the symbol $Y_{n-1}$ therefore, likely includes a significant amount of in domain crosstalk.

As shown by FIG. 4, a multiplier 175 receives the final decision symbol $D_n$ from the symbol decision element 44 of $path_n$ and multiplies this symbol $D_n$ by an adaptive coefficient $A_{1,n}$ to provide a cancellation signal 177, which represents an estimation of the inverse of the in domain crosstalk interference from subscriber line 18 interfering with the symbol $Y_1$. The summer 172 adds the cancellation signal 177 to the estimated symbol $Y_1$ thereby canceling crosstalk interference from subscriber line 18.

In addition, a multiplier 185 receives the final decision symbol $D_{n-1}$ from symbol decision element 34 of $path_{n-1}$ and multiplies this symbol $D_{n-1}$ by an adaptive coefficient $A_{1,n-1}$ to provide a cancellation signal 187, which represents an estimation of the inverse of the in domain crosstalk interference from subscriber line 17 interfering with the symbol $Y_1$. The summer 172 adds the cancellation signal 187 to the estimated symbol $Y_1$ thereby canceling crosstalk interference from subscriber line 17.

Thus, the symbol ($Z_1$) output by the summer 172 is ideally free of in domain crosstalk interference, although there is likely to be remaining noise and alien crosstalk, and it is possible that there may also be some residual in domain crosstalk. However, since the cancellation signals 177, 187 are based on the decision symbols $D_n$, $D_{n-1}$, which likely contain no noise or crosstalk, the cancellation signals 177, 187 likely provide a better estimation of the crosstalk interference from subscriber lines 17, 18 as compared to cancellation signals 52, 53 (FIG. 1) and, therefore, better cancel such crosstalk interference, assuming the decisions are correct.

Note that the error signal $E1_n$ is indicative of noise, such as alien crosstalk, that interferes with the estimated symbol $Y_n$. In addition, the error signal $E1_{n-1}$ is indicative of noise, such as alien crosstalk, that interferes with the estimated symbol $Y_{n-1}$.

In the exemplary embodiment shown by FIG. 4, a multiplier 181 receives the error signal $E1_n$ and multiplies such signal by a coefficient, $Q_{1,n}$ to provide a cancellation signal 183, which represents an inverse of an estimate of various correlated error sources, such as noise and alien crosstalk, found in $path_1$. A summer 192 adds the cancellation signal 183 to the symbol $Z_1$ from the summer 172 thereby canceling various noise from the symbol $Z_1$ to provide a symbol $T_1$ that contains less error relative to the symbol $Z_1$ prior to the summer 192.

In addition, a multiplier 201 receives the error signal $E1_{n-1}$ and multiplies such signal by a coefficient, $Q_{1,n-1}$ to provide a cancellation signal 203, which represents an inverse of an estimate of various correlated error sources, such as noise and alien crosstalk found in $path_1$. The summer 192 adds the cancellation signal 203 to the symbol $Z_1$ from the summer 172 thereby canceling various noise from the symbol $Z_1$ to provide a symbol $T_1$ that contains less error relative to the symbol $Z_1$ prior to summer 192.

The symbol decision element 24 receives the symbol $T_1$ from the summer 192 and performs a known decision process on the symbol $T_1$ to convert $T_1$ to a decided symbol ($D_1$).

The summer 28 subtracts the estimated symbol $Z_1$ from the decided symbol $D_1$ to provide an error signal $E1_1$, which is used to update the coefficients (i.e., $C_{1,1}$, $A_{1,n-1}$, and $A_{1,n}$) on which the symbol $Z_1$ is based. In this regard, as shown by FIG.

5, a coefficient manager 211 stores the coefficients $C_{1,1}$, $A_{1,n-1}$, and $A_{1,n}$ and provides such coefficients to the multipliers 22, 175, 185. The coefficient manager 211 receives the error signal $E1_1$ and uses a known coefficient update algorithm, such as LMS, to update the coefficients $C_{1,1}$, $A_{1,n-1}$, and $A_{1,n}$ based on the error signal $E1_1$. Thus, the coefficients are adaptively updated to initially train the crosstalk cancellation system and to better eliminate error as conditions change.

In addition, a summer 225 subtracts the estimated symbol $T_1$ from the decided symbol $D_1$ to provide an error signal $E2_1$, which is used to update each Q coefficient on which the symbol $T_1$ is based. In the current example, $T_1$ is based on $Q_{1,n-1}$ and $Q_{1,n}$. As shown by FIG. 5, a coefficient manager 233 stores the coefficients $Q_{1,n-1}$ and $Q_{1,n}$ and provides such coefficients to the multipliers 181, 201. The coefficient manager 233 receives the error signal $E2_1$ and uses a known coefficient update algorithm, such as LMS, to update the coefficients $Q_{1,n-1}$ and $Q_{1,n}$ based on the error signal $E2_1$. Thus, the coefficients $Q_{1,n-1}$, and $Q_{1,n}$ are adaptively updated to initially train the crosstalk cancellation system and to better eliminate error as conditions change.

Figure 6:
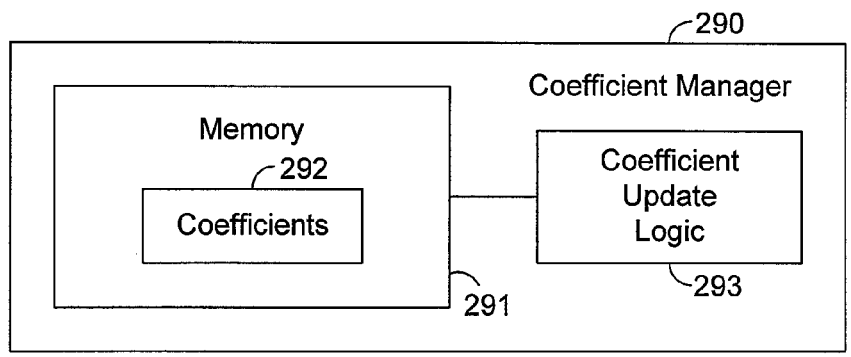
FIG. 6 is a block diagram illustrating an exemplary embodiment of a coefficient manager, such as is depicted in FIG. 5.

Various configurations of the coefficient managers described above are possible. FIG. 6 depicts an exemplary embodiment of a coefficient manager 290. The coefficient managers 60, 161, 171, 211, 233 may be configured similar or identical to the coefficient manager 290 depicted by FIG. 6. In this regard, the coefficient manager 290 has memory 291 for storing coefficients 292, such as any of the A, C, or Q coefficients described above. Further, the manager 290 comprises coefficient update logic 293, which is configured to receive an error signal and to adaptively update the coefficients 292 based on the error signal using any known coefficient update algorithm, such as LMS. Further, upon updating a coefficient, the logic 293 transmits the updated coefficient to the components, such as multipliers, that use such coefficient.

Note that that various components shown by FIGS. 4-6, including summers, multipliers, symbol decision elements, and coefficient update logic, may be implemented in hardware, software, or a combination thereof. The summers and multipliers can be easily implemented in hardware, although it is possible to implement these components in software, if desired. The symbol decision elements and the coefficient update logic may employ more complex algorithms relative to the summers and multipliers, and it may be desirable to implement at least a portion of the symbol decision elements and the coefficient update logic in software. If any of the components are indeed implemented in software, then the receivers 101-103 may comprise one or more processing elements (not shown), such as a digital signal processor (DSP), for executing the instructions of the software.

As described above, each path, from n to 1, uses the decided symbols and error signals from the previous paths. For example, as described above, $path_{n-1}$ uses the decided symbol $D_n$ and error signal $E1_n$ of $path_n$ to cancel noise, including both in domain and alien crosstalk. Further, $path_1$ uses the decided symbols $D_n$, $D_{n-1}$ and error signals $E1_n$, $E1_{n-1}$ of $path_n$ and $path_{n-1}$ to cancel noise, including both in domain and alien crosstalk. Thus, in general, better noise cancellation occurs for each successive path from n to 1. In this regard, noise is generally canceled better in $path_{n-1}$ relative to $path_n$ since at least some in domain crosstalk is canceled based on a decided symbol $D_n$, which likely contains no noise and crosstalk, and at least some other types of noise are cancelled based on error signal $E1_n$. In addition, noise is canceled better in $path_1$ relative to $path_{n-1}$ since a greater number of decided symbols are used to cancel in domain crosstalk in $path_1$ and a greater number of error signals from different paths are used to cancel other types of noise, such as alien crosstalk and RF interference. Although the noise cancellation for $path_n$ is similar to the noise cancellation described above for conventional system 10, the noise cancellation for the other paths is improved and generally improves to a greater extent for each successive path from n to 1.

Note that, for paths going from n to 1, it is unnecessary for each path to use a final decision symbol and an error signal from each preceding path. For example, in the exemplary embodiment shown by FIG. 4, it is unnecessary for both $path_{n-1}$ and $path_1$ to use the final decision symbol ($D_n$) from $path_n$ to cancel crosstalk interference induced by energy from subscriber line 18. In this regard, either $path_{n-1}$ or $path_1$ may use the estimated symbol $X_n$, instead of the final decision $D_n$ to cancel crosstalk interference caused by energy from subscriber line 18, or either $path_{n-1}$ or $path_1$ may refrain from attempting to cancel such crosstalk interference altogether. However, as described above, using the final decision $D_n$ rather than the estimated symbol $X_n$ generally cancels crosstalk interference more effectively and helps to reduce symbol error. Thus, it is generally desirable to use the final decision symbol $D_n$ instead of the estimated symbol $X_n$ for as many paths as is possible. In addition, it is possible for either $path_{n-1}$ or $path_1$ to refrain from using the error signal $E1_n$ of $path_n$ to cancel noise. However, using the error signal $E1_n$ to cancel noise helps to reduce error.

As described above, FIG. 4 depicts an arrangement of components for processing a single tone of the DMT signals communicated across subscriber lines 16-18. For each tone to be processed, a similar arrangement is used. Such additional arrangements are not shown in FIG. 4 for brevity purposes.

In addition, the initialization of the coefficients used by the exemplary system 100 described above can be less complicated than the initialization of coefficients used in many conventional systems to compensate for noise and crosstalk. In this regard, the process for initializing the coefficients in the system 100 can be the same as the process for adaptively updating the coefficients. For example, the coefficients can be initially set to a value of zero and then adaptively updated during an initialization phase that precedes a data phase in order to initialize the coefficients for the data phase. Such initialization can be accomplished without performing complex mathematical operations, such as matrix inversions, sometimes employed to initialize coefficients in conventional systems.

In addition, it should be observed that the exemplary system 100 avoids undesirable coefficient interactions between corresponding A and C coefficients by eliminating, in each path, the use of C coefficients for which corresponding A coefficients are used to cancel crosstalk. For example, in $path_{n-1}$ of FIG. 4, the use of $C_{n-1,n}$ is eliminated since a corresponding A coefficient (i.e., $A_{n-1,n}$) is used to cancel crosstalk. Moreover, the adaptation of any of the A coefficients should not adversely affect the adaptation of the C coefficients used by the system 100. Further, avoidance of such undesirable coefficient interactions is achieved without a significant performance penalty since corresponding Q coefficients are used to essentially perform a noise whitening process to eliminate any remaining correlated noise, including alien crosstalk. For example, in the $path_{n-1}$, coefficient, $C_{n-1,n}$, has been eliminated, but the coefficient, $Q_{n-1,n}$, is used to eliminate correlated noise that would have otherwise been canceled by the eliminated C coefficient, $C_{n-1,n}$.

Note that the system 100 can be easily "pruned" to simplify its implementation. In this regard, any of the coefficients and the associated circuitry for processing such coefficients can be eliminated without adversely affecting the processing of the remaining coefficients. For example, for any path in which crosstalk is insignificant, the coefficients that would otherwise attempt to cancel such crosstalk can be eliminated.

Figure 7:
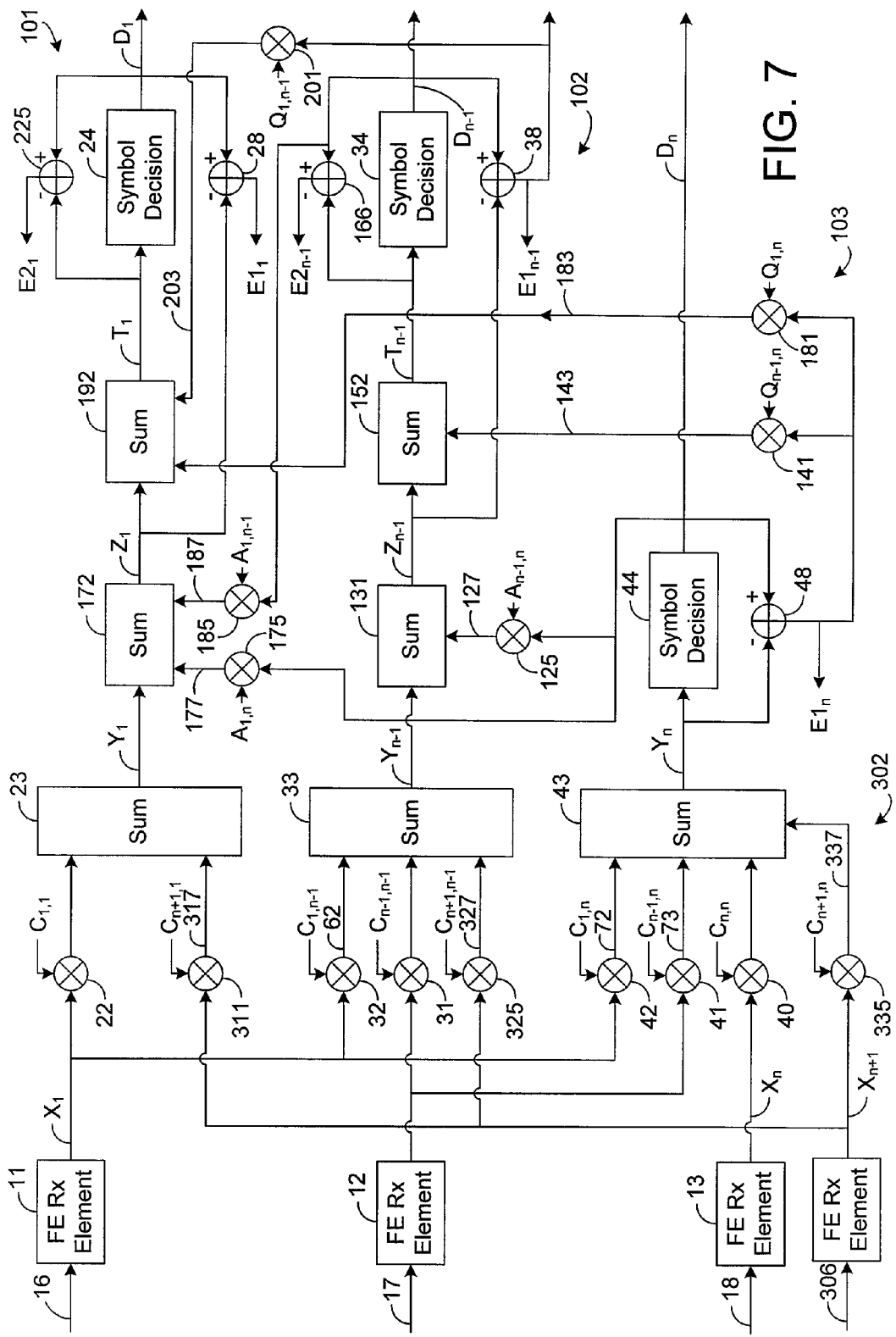
FIG. 7 is a block diagram illustrating an exemplary embodiment of receivers depicted in FIG. 3.

Furthermore, various modifications to the exemplary system 100 depicted by FIGS. 3 and 4 are possible. For example, the receivers 101-103 may be configured to receive additional inputs to enable them to cancel noise from various other interferers. Cancellation signals based on such inputs could be received by summers 23, 33, 43 in order to cancel noise from the estimated symbols. For example, FIG. 7 depicts an exemplary embodiment that is identical to the embodiment shown by FIG. 4 except that the embodiment of FIG. 7 has an additional receiver 302 that is coupled to an input line 306 that may represent an additional subscriber line or some other auxiliary input, such as a common mode signal or other source. Assume that the receiver 302 is not receiving symbols transmitted from a far end of the system and intended to be a part of the information transmission system. Nevertheless, this receiver 302 is coupled to the input line 306, either differentially or using a common mode connection, which is bundled in the same cable 107 (FIG. 3) as the subscriber lines 16-18, although it may not involve an active transmitter at the far end of the system. Alternatively, input line 306 may be a common mode input from any of the subscriber lines 16-18, or it may represent any other conductor or signal connection that is in proximity to subscriber lines 16-18 and so is affected by some noise components that may be correlated with the crosstalk and other noise found on one or more of the lines 16-18. In any such example, any noise or crosstalk energy detected from the subscriber line 306 may be correlated with the noise and crosstalk that couples into any of the subscriber lines 16-18 due to alien crosstalk or RF interference or some other noise source. The system 100 shown by FIG. 7 is configured to provide cancellation signals for cancelling such alien crosstalk, RF interference, or other correlated noise from each path.

In this regard, for $path_1$, a signal $(X_{n+1})$ from the receiver 302 is received by a multiplier 311. The multiplier 311 multiplies the signal $X_{n+1}$ by an adaptive coefficient $C_{n+1,1}$ to provide a cancellation signal 317, which represents an estimation of the inverse of some correlated components of alien crosstalk, RF interference, or other noise detected from the source 306 for the signal $X_1$. The source 306 may be a subscriber line, or a common mode input from one of the other subscriber lines 16-18, or another potentially correlated source. Thus, by adding the cancellation signal 317 to the output of multiplier 22, the summer 23 may cancel some correlated components of alien crosstalk or other interference detected using the source 306. Note that the coefficient $C_{n+1,1}$ may be stored by the coefficient manager 211 (FIG. 5), which adaptively updates the coefficient based on the error signal $E1_1$.

For $path_{n-1}$, the signal $(X_{n+1})$ from the receiver 302 is received by a multiplier 325. The multiplier 325 multiplies the signal $X_{n+1}$ by an adaptive coefficient $C_{n+1,n-1}$ to provide a cancellation signal 327, which represents an estimation of the inverse of some correlated components of alien crosstalk or other interference detected using the source 306. Thus, by adding the cancellation signal 327 to the output of multiplier 31, the summer 33 may cancel some correlated components of alien crosstalk or other interference detected using the source 306. Note that the coefficient $C_{n+1,n-1}$ may be stored by the coefficient manager 161 (FIG. 5), which adaptively updates the coefficient based on the error signal $E1_{n-1}$.

For $path_n$, the estimated signal $(X_{n+1})$ from the receiver 302 is received by a multiplier 335. The multiplier 335 multiplies the signal $X_{n+1}$ by an adaptive coefficient $C_{n+1,n}$ to provide a cancellation signal 337, which represents an estimation of the inverse of some correlated components of alien crosstalk or other interference detected using the source 306. Thus, by adding the cancellation signal 337 to the output of multiplier 40, the summer 43 may cancel some correlated components of alien crosstalk or other interference detected using the source 306. Note that the coefficient $C_{n+1,n}$ may be stored by the coefficient manager 60 (FIG. 5), which adaptively updates the coefficient based on the error signal $E1_n$.

An exemplary use and operation of the system 100 for processing a DMT signal in $path_{n-1}$ to determine a final decision symbol $D_{n-1}$ for the received signal will be described below with reference to FIG. 8.

Figure 8:
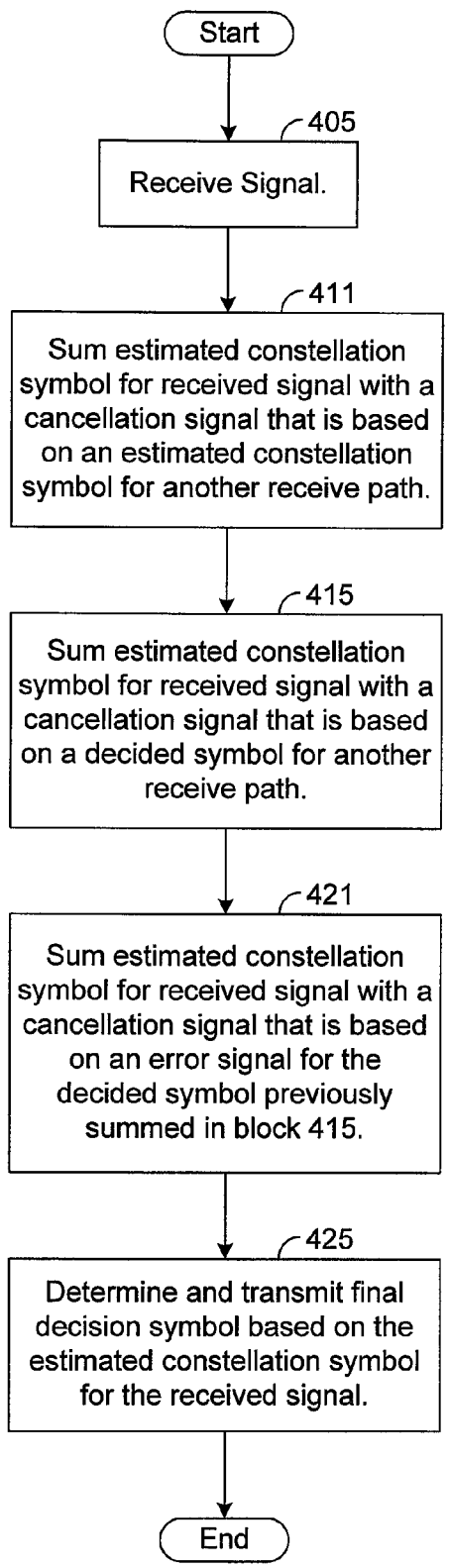
FIG. 8 is a flow chart illustrating an exemplary method for processing a received data signal.

The receiver 102 receives a DMT signal from the subscriber line 17, as shown by block 405 of FIG. 8. The receiver 102 demodulates the received signal and estimates a symbol $X_{n-1}$ for the received signal. The estimated symbol is multiplied by a coefficient $C_{n-1,n-1}$ before being received by the summer 33. The summer 33 sums the estimated symbol from the subscriber line 17 with a cancellation signal 62 that is based on an estimated symbol $X_1$ received from another subscriber line 16 in order to cancel in domain crosstalk from such subscriber line 16 thereby providing an estimated symbol $Y_{n-1}$, as shown by block 411 of FIG. 8.

The summer 131 sums the estimated symbol $Y_{n-1}$ with a cancellation signal 127 that is based on a decided symbol $D_n$ received from another subscriber line 18 in order to cancel in domain crosstalk from such subscriber line 18 thereby providing an estimated symbol $Z_{n-1}$, as shown by block 415 of FIG. 8. In addition, the summer 152 sums the estimated symbol $Z_{n-1}$ with a cancellation signal 143 that is based on an error signal $E1_n$ for the decided symbol previously summed in block 415 thereby providing an estimated symbol $T_{n-1}$, as shown by block 421. The symbol decision element 34 then determines and transmits a final decision symbol $D_{n-1}$ for $path_{n-1}$ based on the estimated symbol $T_{n-1}$, as shown by block 425. Note that before this final decision is made, various noise has been cancelled from the estimated symbol via performance of blocks 411, 415, 421 thereby improving the quality of the input symbol processed by the element 34. In particular, performance of blocks 411, 415 cancel in domain crosstalk from the estimated symbol, and performance of block 421 cancels other types of correlated noise, such as alien crosstalk, RF interference, and any noise that may be introduced by the cancellations signals summed in block 411.

Now, therefore, the following is claimed:

1. A system for communicating digital multi-tone (DMT) signals, comprising:
    memory for storing a first C coefficient;
    a first receiver path having a first front-end (FE) receiving element, a first signal combiner, a second signal combiner, a third signal combiner, and a first symbol decision element, the first and second signal combiners between the first FE receiving element and the first symbol decision element, the first FE receiving element configured to receive a first DMT signal from a first subscriber line and to transmit a first estimated constellation symbol of the first DMT signal, the first symbol decision element configured to transmit, based on the first estimated constellation symbol, a first decided symbol; and
    a second receiver path having a second FE receiving element, a fourth signal combiner, a fifth signal combiner, a sixth signal combiner, and a second symbol decision element, the fourth signal combiner between the second FE receiving element and the second symbol decision element, the second FE receiving element configured to receive a second DMT signal from a second subscriber line and to transmit a second estimated constellation symbol of the second DMT signal, the second symbol decision element configured to transmit, based on the second estimated constellation symbol, a second decided symbol, the fifth signal combiner configured to combine the first C coefficient and the first estimated constellation symbol thereby providing a first cancellation signal, the fourth signal combiner configured to combine the first cancellation signal and the second estimated constellation symbol, the sixth signal combiner configured to combine a Q coefficient and an error signal indicative of a first error associated with the second estimated constellation symbol thereby providing a second cancellation signal, wherein the third signal combiner is configured to combine the second decided symbol and an A coefficient thereby providing a third cancellation signal, wherein the first signal combiner is configured to combine the first estimated constellation symbol and the third cancellation signal, wherein the second symbol combiner is configured to combine the first estimated constellation symbol and the second cancellation signal, wherein the first C coefficient is adaptively updated based on the first error, wherein the Q coefficient is adaptively updated based on a second error associated with the first estimated constellation symbol, and wherein the A coefficient is adaptively updated based on a third error associated with the first estimated constellation symbol.

2. The system of claim 1, wherein the third error indicates a difference between the first estimated constellation symbol and the first decided symbol before the second cancellation signal is combined with the first estimated constellation symbol.

3. The system of claim 2, wherein the second error indicates a difference between the first estimated constellation symbol and the first decided symbol after the second cancellation signal is combined with the first estimated constellation symbol.

4. The system of claim 1, wherein the second receiver path has a seventh signal combiner configured to combine a second C coefficient and a third estimated constellation symbol from a third receiver path thereby providing a fourth cancellation signal, wherein the fourth signal combiner is configured to combine the fourth cancellation signal and the second estimated constellation symbol, wherein the second C coefficient is adaptively updated based on the first error.

5. The system of claim 4, wherein the first receiver path has an eighth signal combiner configured to combine a third C coefficient and the third estimated constellation symbol thereby forming a fifth cancellation signal, wherein the first receiver path has a ninth signal combiner configured to combine the fifth cancellation signal and the first estimated constellation symbol, and wherein the third C coefficient is adaptively updated based on the third error.

6. The system of claim 1, wherein the estimated constellation signal, when received by the third signal combiner, is not based on any combination of the second estimated constellation signal with any C coefficient.

7. The system of claim 1, wherein the first symbol decision element comprises a decoder.

8. The system of claim 1, wherein the first symbol decision element comprises a slicer.

9. A system for communicating digital multi-tone (DMT) signals, comprising:
    memory for storing a first C coefficient;
    a first receiver for processing a DMT signal received from a first subscriber line, the first receiver having a first symbol decision element configured to determine and transmit a first decided symbol for the first receiver based on a first estimated constellation symbol for the first receiver; and
    a second receiver for processing a signal received from a second subscriber line, the second receiver having a second symbol decision element configured to determine and transmit a second decided symbol for the second receiver based on a second estimated constellation symbol for the second receiver, the second receiver configured to combine a first cancellation signal with the second estimated constellation symbol, the first cancellation signal based on a combination of the first C coefficient and the first estimated constellation symbol;
    wherein the first receiver is configured to combine a second cancellation signal and a third cancellation signal with the first estimated constellation symbol, the second cancellation signal based on a combination of a Q coefficient and an error signal indicative of a difference between the second estimated constellation symbol and the second decided symbol, the second cancellation signal based on a combination of an A coefficient and the third decided symbol, wherein combining the first cancellation signal with the second estimated constellation symbol cancels, from the second estimated constellation symbol, crosstalk interference induced by energy from the first subscriber line, and wherein combining the third cancellation signal with the first estimated constellation symbol cancels, from the first estimated constellation symbol, crosstalk interference induced by energy from the second subscriber line.

10. The system of claim 9, wherein the first C coefficient is adaptively updated based on the difference between the second estimated constellation symbol and the second decided symbol, wherein the A coefficient is adaptively updated based on a difference between the first decided symbol and the first estimated constellation symbol before second cancellation signal is combined with the first estimated constellation symbol, and wherein the Q coefficient is adaptively updated based on a difference between the first decided symbol and the first estimated constellation symbol after the second cancellation signal is combined with the first estimated constellation symbol.

11. The system of claim 9, wherein first receiver does not combine the second estimated constellation signal with any C coefficient.

12. The system of claim 9, wherein the first receiver is configured to combine a fourth cancellation signal with the first estimated constellation symbol, the fourth cancellation signal based on a combination of a second C coefficient and a third estimated constellation symbol from a third receiver, and wherein the second receiver is configured to combine a fifth cancellation signal with the second estimated constellation symbol, the fifth cancellation signal based on a combination of a third C coefficient and the third estimated constellation symbol.

13. The system of claim 12, wherein the second receiver is configured to adaptively update the third C coefficient based on the difference.

14. A method for communicating digital multi-tone (DMT) signals, comprising the steps of:
- storing, in memory, a first C coefficient;
- receiving a first DMT signal from a first subscriber line;
- estimating a first constellation symbol based on the first DMT signal;
- determining a first decided symbol based on the first constellation symbol;
- receiving a second DMT signal from a second subscriber line;
- estimating a second constellation symbol based on the second DMT signal;
- determining a second decided symbol based on the second constellation symbol;
- combining the first C coefficient and the first constellation symbol thereby forming a first cancellation signal;
- combining a Q coefficient and an error signal thereby forming a second cancellation signal, the error signal indicative of a first error associated with the second constellation symbol;
- combining an A coefficient and the second decided symbol thereby forming a third cancellation signal;
- cancelling, from the first constellation symbol, noise including crosstalk interference induced by energy from the second subscriber line based on the second and third cancellation signals; and
- cancelling, from the second constellation symbol, crosstalk interference induced by energy from the first subscriber line based on the first cancellation signal.

15. The method of claim 14, further comprising the steps of:
- adaptively updating the first C coefficient based on the first error;
- adaptively updating the A coefficient based on a second error associated with the first constellation symbol; and
- adaptively updating the Q coefficient based on a third error associated with the first constellation symbol.

16. The method of claim 15, wherein the second error is associated with the first constellation symbol before the first constellation symbol is combined with the second cancellation signal, and wherein the third error is associated with the first constellation symbol after the first constellation symbol is combined with the second cancellation signal.

17. The method of claim 14, further comprising the steps of:
- combining a second C coefficient with a third constellation symbol thereby forming a fourth cancellation symbol;
- combining a third C coefficient with the third constellation symbol thereby forming a fifth cancellation symbol;
- cancelling, from the first constellation symbol, crosstalk interference induced by energy from a third subscriber line based on the fourth cancellation signal; and
- cancelling, from the second constellation symbol, crosstalk interference induced by energy from the third subscriber line based on the fifth cancellation symbol.

18. The method of claim 17, further comprising the step of adaptively updating the third C coefficient based on the first error.

* * * * *